Aug. 9, 1938.  M. H. JOHANSON  2,126,262
CUTTER FOR AND METHOD OF CUTTING GEARS
Filed May 16, 1936
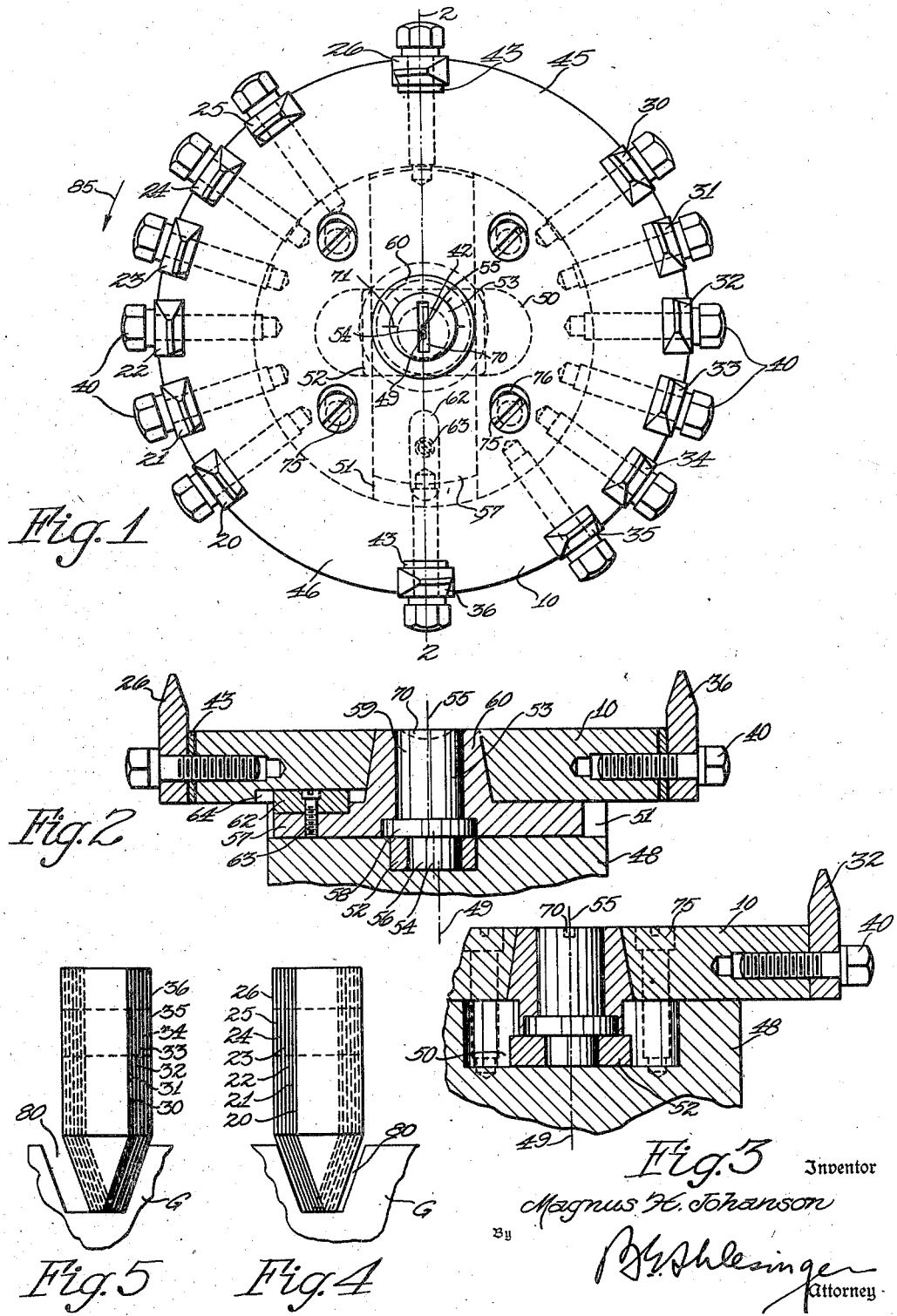
Inventor
Magnus H. Johanson
By
B. Schlesinger
Attorney Patented Aug. 9, 1938

2,126,262

UNITED STATES PATENT OFFICE 2,126,262

CUTTER FOR AND METHOD OF CUTTING GEARS

Magnus H. Johanson, Rochester, N. Y., assignor to Gleason Works, Rochester, N. Y., a corporation of New York Application May 16, 1936, Serial No. 80,209

15 Claims. (Cl. 29—105)

The present invention relates to a method and to apparatus for producing gears, particularly longitudinally curved tooth gears and especially spiral bevel and hypoid gears.

The primary objects of the present invention are to provide both an improved method and improved apparatus for finish-cutting longitudinally curved tooth non-generated gears.

A further object of the invention is to provide a simpler and less expensive form of cutter of a type such as may be used for finish-cutting longitudinally curved tooth non-generated gears by a process in which the cutter is adjusted into engagement with a gear blank to cut to the full depth of the tooth spaces of the blank without relative feed movement and the blank is held stationary while the cutter is cutting and is indexed when a gap between the blades of the cutter is abreast of the blank.

A still further purpose of the invention is to provide a cutter for cutting longitudinally curved tooth gears according to a process such as described in which a face mill cutter may be used that has not only cutting blades which are all of the same height, but which are also arranged all at substantially the same distance from the axis of the cutter so that the cost of the cutting blades may not only be kept at a minimum but also the blades may very easily be assembled on the cutter head.

Other objects of the invention will be apparent hereinafter from the specification and from the recital of the appended claims.

In the drawing:

Fig. 1 is a plan view of a cutter constructed according to one embodiment of this invention and of its mounting;

Fig. 2 is a sectional view of the cutter and its mounting taken on the line 2—2 of Fig. 1;

Fig. 3 is a fragmentary sectional view through the cutter and mounting taken at right angles to the section of Fig. 2; and Figs. 4 and 5 are diagrammatic views, illustrating successive steps in the cutting of a tooth space of a gear by the method and apparatus of the present invention.

The present invention relates as already indicated specifically to the finish-cutting of non-generated gears, and the preferred form of cutter and apparatus is intended to operate upon a gear blank, the tooth spaces of which have already been roughed out to their full depth but not to their full width or final profile.

In the preferred embodiment of the invention, a cutting tool is used which has the general form of a face-mill and has a plurality of cutting blades projecting from one side face in the general direction of its axis, all of which are of the same height. The blades are arranged in two groups. One group consists of the outside cutting blades, that is, the blades for cutting one side of a tooth space of the gear blank, and the other group consists of the inside cutting blades, the blades for cutting the other side of the tooth spaces of the blank. The blades do not extend around the full periphery of the cutter and there is a gap between the last blade of one group and the first blade of the other group. This gap is provided to permit of indexing the gear blank when the gap in the cutter is abreast of the blank and without withdrawing the blank from operative relation with the cutter. The majority of blades of each group operate as stocking-out blades, removing the principal part of the stock left after the rough-cutting operation and the finishing cuts are taken preferably by the final blade of each group alone.

The cutter is preferably mounted eccentrically upon the cutter spindle of the gear cutting machine with the two groups of blades so disposed around the axis of the spindle that as the spindle rotates, the outside cutting blades cut at successively increasing radial distances from the axis of the spindle, widening the tooth space at one side, and the inside blades cut at successively decreasing distances from the axis of the spindle widening the tooth space at the opposite side thereof.

The cutter is first adjusted into engagement with the blank so that the blades of the cutter will cut to full depth of the tooth spaces of the blank without relative feed movement. The cutter rotates continuously at a uniform rate on its axis during the whole of the cutting operation. The gear, however, is held stationary while the successive cutting blades of the two groups pass through and complete one tooth space of the gear. Then, as the gap between the cutting blades passes the blank, the blank is indexed to bring a new tooth space of the gear into position to be finish-cut in the next revolution of the cutter. Thus, in every revolution of the cutter, a tooth space of the gear is finished and when the cutter has made as many revolutions as there are tooth spaces in the blank the gear will be finished.

In the preferred embodiment of the invention, the last blade of each group of blades, which is the finishing blade, is spaced from the next preceding blade of that group a distance no less than the width of face of the gear to be cut so that when this last blade passes through the tooth space of the blank, it will be the only blade in the cut and the cleanness of the cut will not be disturbed by the thrust of any preceding or following blade. This insures a cleaner, smoother finishing cut on each side of the tooth spaces of the blank.

Reference will now be had to the drawing for a more detailed description of the invention.

10 denotes the head or body of a cutter constructed according to a preferred embodiment of this invention for practicing the method of this invention. The cutter has a plurality of cutting blades, designated 20, 21, 22, etc., which have their front-faces sharpened to provide outside cutting edges, and a plurality of cutting blades, designated 30, 31, 32, etc., which have their front-faces sharpened to provide inside cutting edges. The blades are secured to the cutter head by bolts 40 with their cutting portions projecting beyond one side face of the head in the general direction of the axis of the head.

The blades 20 to 25 inclusive operate as stocking-out blades for one side of a tooth space and are preferably non-adjustably mounted in the head. They are all alike and all at substantially the same radial distance from the center 42 of the head. The last outside cutting blade, 26, which is the finishing blade for this side of the tooth, is mounted preferably, as shown, to be radially adjustable in the head. For the purpose of effecting adjustment of this blade, a shim 43 may be provided or wedges and shims may be used as is common in face-mill finishing cutters.

The inside blades 30 to 35 which operate as stocking-out blades for the opposite side of the tooth space are also preferably secured non-adjustably to the cutter head. They are all alike and all substantially at the same radial distance from the axis of the cutter head. These blades may be secured at the same radial distance from the center of the cutter head as are the outside stocking-blades 20–25 inclusive but, of course, the outside and inside cutting edges, respectively, of the two groups of blades will lie at different radial distances from the center of the head. The last of the inside cutting blades, 36, may, however, like the last of the outside cutting blades, be adjustably mounted in the head so as to be adjustable radially of the center of the head.

The last outside cutting blade 26 is spaced angularly from the next preceding outside cutting blade 25 a distance preferably slightly greater than the width of face of the gear to be cut. This is so that while the last blade 26 is taking its cut on one side of a tooth space of the gear blank, no other blade will be in engagement with the blank. Likewise, the last inside cutting blade 36 is spaced angularly from the next preceding inside cutting blade 35 a distance greater than the width of face of the gear to be cut. It has been found that this insures the greatest possible accuracy and smoothness of tooth surface finish. The blades 20 to 25 inclusive and 30 to 35 inclusive may be mounted relatively close to one another for economy of space and to insure as many cuts as possible on the two sides of the tooth space and two or more of these blades may, without detriment, operate on a side of a tooth space at the same time.

There is a considerable free space or gap at 45 between the last outside cutting blade 26 and the first inside cutting blade 30 and likewise there is a considerable free space or gap at 46 between the last inside cutting blade 36 and the first outside cutting blade 20. While either of these spaces or gaps are passing the gear blank, during the continuous uniform rotation of the cutter head, there is ample time to index the blank and the blank may be indexed accordingly when either of these spaces or gaps are abreast of the blank.

The present cutter is intended to operate upon a gear blank that is stationary during cutting and where there is no relative rolling motion between the cutter and blank during the cutting operation. It is intended that each of the cutting blades, both for the outside and the inside, shall take a cut on one side or other of the tooth space, successively widening out the tooth space. In order to secure this result, the cutter head is mounted eccentrically upon the cutter spindle 48 of the gear cutting machine to be used in the cutting operation.

One way in which the cutter may be eccentrically mounted is illustrated in the drawing. Here the forward end of the cutter spindle 48 is cut away to provide two slots 50 and 51 which lie one below the other and extend at right angles to one another. Mounted in the slot 50 is a block 52 which is free to slide longitudinally in the slot but which seats against and is guided by the side walls of the slot so that it is held against transverse movement therein.

This block is provided with a circular opening which is adapted to receive one end 56 of a crank pin or eccentric 53. This crank pin is so made that the center or axis 54 of the end which is received within the block 52 is eccentric of the center or axis 55 of that portion of the pin which extends outwardly beyond the block 52 and the diameter of the portion 56 of the pin and location of the opening in the block 52 which receives that portion of the pin are preferably such that the center 54 of the end 56 of the pin is offset from the axis 49 of the cutter spindle the same distance that the center 55 of the pin is offset from the center 54 of the pin. This makes it possible to bring the centers or axes 55 and 49 into alignment by rotating the pin through an angle of 180° from its position of maximum eccentricity.

The outwardly extending portion of the crank pin, which comprises the end portion 59 and the shoulder portion 58, engages in a suitably shaped aperture or opening in a block 57 that is laterally movable in the slot 51 of the cutter spindle. This block is free to move longitudinally in the slot 51 in a direction at right angles to the movement of the block 52 but it is guided in its movement by the side walls of the slot 51 and is therefore held against transverse movement in this slot.

The block 57 is formed with a conical nose portion 60 which is concentric of the parts 59 and 58 of the crank pin and which is adapted to engage in a central conical opening or aperture in the cutter head 10 so that, when the cutter head is mounted upon the block 57, its cutting blades are arranged concentrically of the axis 55 of the projecting portion 59 of the crank pin and the axis 55 passes through the center 42 of the head. There is a key 62 secured to the block 57 by a screw 63. This key is adapted to engage in a slot 64 formed in the back face of the cutter head and to drive the cutter head upon rotation of the cutter spindle.

The eccentricity of the cutter head relative to the axis 49 of the cutter spindle may be adjusted by rotating the crank pin 53. For this purpose a cleft 70 is cut into the outer end of the crank pin to receive a screw driver or other suitable tool. An index mark 71 is provided on the tip of the crank pin to read against graduations provided on the tip of the nose 60 of the block 57 so that the amount of eccentricity of the cutter head can be adjusted accurately. After adjustment, the cutter head is secured rigidly to the cutter spindle by bolts 75 which pass through slots 76 in the cutter head and thread into the cutter spindle.

Since all of the outside cutting blades 20 to 25 inclusive and all of the blades 30 to 35 inclusive are arranged at the same radial distances, respectively, from the center 42 of the cutter head which coincides with the axis 55 of the outer portion of the crank pin, it will be seen that when the crank pin is in an adjusted position where the axis 55 is eccentric to the axis 49 of the cutter spindle, the successive blades 20 to 25 inclusive and 30 to 35 inclusive, respectively, will cut successively at different radial distances from the axis 49 of the cutter spindle as the cutter spindles rotates. By suitably mounting the cutter head upon the cutter spindle, then, it will be seen that the successive outside cutting blades 20 to 25 inclusive may be made to cut, as desired, further and further away from the axis 49 of the cutter spindle and the inside cutting blades 30 to 35 inclusive to cut closer and closer to the axis 49 of the cutter spindle, as the spindle rotates.

If the blades 20 to 25 inclusive are spaced equidistantly around the periphery of the cutter head, they will cut substantially equal amounts of stock from one side of a tooth space in the rotation of a cutter head and likewise if the inside cutting blades 30 to 35 inclusive are equidistantly spaced around the periphery of the head these blades will take equal cuts on a side of a tooth space at the opposite side thereof. The final outside and inside cutting blades 26 and 36, respectively, which are intended to produce the final finishing cuts on the two sides of the tooth spaces can be adjusted by means of the shims 43 to take cuts of any desired thickness on the sides of the tooth space to give the desired tooth surface finish.

With the constructions and the mounting of the cutter above described, it is seen that as the cutter spindle 48 rotates through a single revolution to carry all the blades successively through a single tooth space of the blank, one set of cutting blades will first widen out the tooth space at one side thereof and produce a finished tooth profile at one side of the space and then the other set of cutting blades will widen out the tooth space at the other side thereof, each blade cutting to the full depth of the tooth space or the full height of the tooth profile.

The successive widening of the tooth space produced by the successive blades is illustrated diagrammatically in Figs. 4 and 5 which represent a cross-section through one tooth space 80 of a gear blank G and which show diagrammatically on an exaggerated scale the successive positions relative to this tooth space of the successive cutting edges of the various blades as the cutter rotates on its axis. The respective cutting edges are designated in this figure by the same reference numerals applied to the respective corresponding blades in Fig. 1.

In the operation of cutting a gear blank, the cutter is first adjusted into engagement with the blank so that as it rotates the cutting blades will cut to the full depth of the tooth spaces of the blank without further relative feed of the cutter into the blank. Then as the cutter rotates in engagement with the blank, the successive outside blades, 20, 21, 22, etc., will cut successively on one side of the tooth space 80 of the gear blank as shown in Fig. 4 and these cuts will be further and further from the axis 49 of the cutter spindle, due to the eccentric mounting of the cutter head on the cutter spindle, and the tooth slot will be widened out as shown in this figure. Then, with the further rotation of the cutter head, the successive inside cutting blades 30 to 36 inclusive will come successively into engagement with the opposite side of the tooth slot and due to the eccentric mounting of the cutter will cut successively closer and closer to the axis 49 of the cutter spindle, widening out the tooth slot at the other side thereof as shown in Fig. 5. If the cutter rotates in the direction of the arrow 85 of Fig. 1, and the outside cutting blades cut first, the blank will be indexed when the gap at 46 in the cutter is abreast of the blank. The operation can be so arranged also, however, so that the inside cutting blades cut first. In this event, the blank will be indexed when the gap 45 in the cutter head is abreast of the blank.

As previously explained, all of the blades preferably are of the same height, that is, project to the same extent at one side of the cutter head. It may be desirable, however, at times to make the finishing blades 26 and 36 a few thousandths of an inch shorter than the stocking-out blades to avoid all bottom cutting by the finishing blades and to confine their cutting action entirely to the sides of the tooth spaces. Even when the finishing blades are made in this manner, they still may be said to cut the full effective height of the tooth profile, since the only parts not cut by the finishing blades are the extreme bottom corners of the tooth spaces and these bottom corners are ineffective and do not come into contact with the teeth of the other gear or pinion meshing with the gear which is cut by the method of the present invention.

With a cutter of the form shown, there is no necessity to provide radial adjustment of the individual blades except possibly of the two final finishing blades 26 and 36. Hence assembly of the blades on the cutter head is relatively simple, and the relatively tedious, slow process of accurately adjusting blades individually to different radial distances from the axis of the cutter head, which is required in some forms of cutters previously used for finish-cutting non-generated gears, is entirely eliminated. Further than this, the present cutter has the advantage over other forms of cutters previously used for finish-cutting non-generated gears that all of the outside blades are identical and all of the inside blades are identical and that therefore the cutter is much cheaper to manufacture than a cutter in which the sizes of the stocking-out blades vary.

With a cutter such as described and mounted eccentrically of the cutter spindle, the stocking-out blades have only a small amount of metal to remove and they do not produce any substantial thrust on the blank in cutting and the finishing is effected by blades which also have only a small amount of stock to remove and which are further spaced from the stocking-out blades so that there will be only one blade in the cut at a time. Hence cutting thrusts are largely eliminated and the primary cause of indexing errors in the cutting of non-generated gears is removed. Further, by the spacing of the finishing blades from the stocking-out blades so that no other blade is in the cut at the same time with the finishing blades, a very smooth tooth surface finish can be obtained. Hence, when gears are cut by the present invention, the greatest accuracy in tooth spacing and a fine tooth surface finish are obtainable.

While the invention has been described in connection with a particular embodiment thereof, it will be understood that it is capable of further modification and this application is intended to cover any variations, uses, or adaptations of the invention following, in general, the principles of the invention and including such departures from the disclosure as come within known or customary practice in the art and as may be applied to the essential features hereinbefore set forth and as fall within the scope of the invention or the limits of the appended claims.

Having thus described my invention, what I claim is:

1. A face-mill gear cutter for cutting gears by continuous rotation of the cutter and intermittent step-by-step indexing of the gear being cut comprising a rotary head and a plurality of cutting blades which are arranged around the periphery of the head to project beyond one side face of the head in the general direction of the axis of the head, said blades having cutting edges of substantially uniform height whose outer ends lie in a plane perpendicular to the axis of the cutter and being arranged in two groups, the blades of one group being sharpened to cut one side of a tooth space of a gear blank and the blades of the other group being sharpened to cut the opposite side of said tooth space, and there being a gap between the last blade of one group and the first blade of the other group so that when said gap is abreast of the gear blank, the blank may be indexed without relative withdrawal of the blank from engagement with the cutter.

2. A face-mill gear cutter for cutting gears by continuous rotation of the cutter and intermittent step-by-step indexing of the gear being cut comprising a rotary head and a plurality of cutting blades which are arranged around the periphery of the head to project beyond one side face of the head in the general direction of the axis of the head, said blades being arranged in two groups, each group comprising a plurality of stocking-out blades and a finishing blade, the stocking-out blades of one group having cutting edges at one side thereof which are all at substantially the same radial distance from the axis of the cutter and the stocking-out blades of the other group having cutting edges at the other side thereof which are also all at substantially the same radial distance from the axis of the cutter but at a less radial distance than the cutting edges of the first group, the cutting edges of each group being of substantially uniform height and having their outer ends lying in a plane perpendicular to the axis of the cutter, said blades being further so arranged that there is a gap between the last blade of one group and the first blade of the other group so that a gear blank may be indexed when said gap is abreast of the blank without relative withdrawal of the blank from engagement with the cutter.

3. A face-mill gear cutter for cutting gears by continuous rotation of the cutter and intermittent step-by-step indexing of the gear being cut comprising a rotary head and a plurality of cutting blades which are arranged around the periphery of the head to project beyond one side face of the head in the general direction of the axis of the head, said blades being arranged in two groups, each having a plurality of stocking-out blades and a final finishing blade, the stocking-out blades of one group having outside cutting edges which are all at substantially the same radial distance from the axis of the cutter and the stocking-out blades of the other group having inside cutting edges which are all at substantially the same radial distance from the axis of the cutter but at a less radial distance than the outside cutting edges, the cutting edges of each group being of substantially uniform height and having their outer ends lying in a plane perpendicular to the axis of the cutter, the last blade of each group being spaced from the next preceding blade of said group a distance no less than the face width of the gear being cut and there being a gap between the last blade of one group and the first blade of the other group so that the gear blank may be indexed while said gap is abreast of the blank without relative withdrawal of the blank from engagement with the cutter.

4. A face-mill gear cutter for cutting gears by continuous rotation of the cutter and intermittent step-by-step indexing of the gear being cut comprising a rotary head and a plurality of cutting blades of substantially uniform height, each having a cutting edge for cutting the entire height of a tooth surface of a gear, said blades being mounted on the head at substantially the same radial distances from the axis of the head and projecting beyond one side face of the head in the general direction of the axis of the head and being arranged part-way only around the periphery of the head so that there is a gap between the last blade and the first blade so that the gear blank may be indexed when said gap is abreast of the blank without relative withdrawal of the blank from engagement with the cutter.

5. The method of cutting a longitudinally curved tooth gear which comprises engaging a tool, having a plurality of cutting blades arranged on a circle and having a gap between the last and first blades with a gear blank so that the tool will cut to the full depth of the tooth spaces of the blank without further feed, rotating the tool about an axis eccentric of said circle, and holding the blank stationary while the blades of the tool are cutting and indexing the blank when the gap in the cutter is abreast of the blank.

6. The method of cutting side tooth surfaces of a longitudinally curved tooth gear which comprises employing a face-mill gear cutter which has a plurality of cutting blades of substantially uniform height arranged concentric of a common center and rotating said cutter about an axis eccentric of said center.

7. The method of cutting side tooth surfaces of a longitudinally curved tooth gear which comprises employing a face-mill gear cutter which has a plurality of cutting blades of substantially uniform height arranged concentric of a common center, engaging said cutter with a gear blank so that said blades will cut to the full depth of the tooth spaces of the blank without relative feed movement, and rotaing said cutter about an axis eccentric of said center.

8. The method of cutting a longitudinally curved tooth gear which comprises employing a face-mill gear cutter that has a plurality of cutting blades of substantially uniform height arranged part-way around its periphery with a gap between the last and first blades with certain of the blades having cutting edges for cutting one side of a tooth space of the blank arranged in a group at the same radial distance from the center of the cutter and other blades for cutting the opposite side of a tooth space of the blank arranged at the same radial distance from the center of the cutter but at a different radial distance from the first group of blades and arranged after the first group in the direction of rotation of the cutter, engaging said cutter with a gear blank so that the blades will cut to the full depth of the tooth spaces of the blank without relative feed movement between the cutter and blank, rotating the cutter about an axis eccentric of its center, and holding the blank stationary while the blades are cutting a tooth space of the blank and indexing the blank while the gap in the cutter is abreast of the blank.

9. Cutting apparatus comprising a rotary head and a plurality of side cutting blades which project beyond one side face of the head in the general direction of the axis of the head and are arranged at equal radial distances from a common center to extend part-way only around the periphery of the head, said head being mounted for rotation about an axis eccentric of said center.

10. Cutting apparatus comprising a rotary cutter spindle, a face-mill gear cutter having a plurality of side cutting blades which project beyond one side face of the cutter in the general direction of the axis of rotation of the cutter and are arranged at substantially equal distances from a common center to extend part-way only around the periphery of the cutter with a gap between the last and first blades, means for adjusting the cutter on the cutter spindle to offset the center of the cutter from the axis of the spindle, and means for securing the cutter to the spindle after adjustment in adjusted position.

11. Gear cutting apparatus for cutting gears in an intermittent indexing operation comprising a rotary head and a plurality of cutting blades which project beyond one side face of the head in the general direction of the axis of rotation of the head and are arranged part-way only around the periphery of the head with a gap between the last and first blades, said blades being arranged concentric of a common center which is eccentric of the axis of the head.

12. Gear cutting apparatus for cutting gears in an intermittent indexing operation comprising a rotary head and a plurality of cutting blades which project beyond one side face of the head in the general direction of the axis of rotation of the head and are arranged in two groups, the blades of both groups being arranged concentric of a common center which is eccentric of the axis of rotation of the head, the blades of one group being sharpened to cut one side of the teeth of a gear and the blades of the other group being sharpened to cut the opposite side of said teeth, the last blade of one group being spaced from the first blade of the other group a distance sufficient to permit indexing the blank when said space is abreast of the blank in the rotation of the head.

13. Gear cutting apparatus for cutting gears in an intermittent indexing operation comprising a rotary head and a plurality of cutting blades which project beyond one side face of the head in the general direction of the axis of rotation of the head and are arranged in two groups, the blades of both groups being arranged concentric of a common center which is eccentric of the axis of rotation of the head, the blades of one group being sharpened to cut one side of the teeth of a gear blank and the blades of the other group being sharpened to cut the opposite side of the teeth, the final blade of each group being a finishing blade and the two finishing blades being arranged 180° apart, and the final blade of one group being spaced from the first blade of the other group a distance sufficient to permit indexing the gear blank when said space is abreast of the blank in the rotation of the head.

14. Gear cutting apparatus for cutting gears in an intermittent indexing operation comprising a rotary head and a plurality of cutting blades which project beyond one side face of the head in the general direction of the axis of rotation of the head and are arranged in two groups, the blades of both groups being arranged concentric of a common center which is eccentric of the axis of rotation of the head, the blades of one group being sharpened to cut one side of the teeth of a gear blank and the blades of the other group being sharpened to cut the opposite side of the teeth, the final blade of each group being a finishing blade and being spaced from the preceding blade of the group a distance greater than the face width of the gear blank being cut, and the final blade of one group being spaced from the first blade of the other group a distance sufficient to permit of indexing the gear blank when said space is abreast of the blank in the rotation of the head.

15. Cutting apparatus comprising a rotary head and a plurality of side-cutting blades which project beyond one side face of the head in the general direction of the axis of the head and are arranged in two separate groups about the axis of the head with a gap between the last blade of each group and the first blade of the other group, the blades of one group being sharpened to cut on one side of a tooth space of a gear blank and the blades of the other group being sharpened to cut on the opposite side of the tooth space of the blank, the blades of the two groups being arranged concentric of a common center, and said cutter being mounted for rotation about an axis eccentric of said center.

MAGNUS H. JOHANSON.